US012748266B2

(12) United States Patent
Levy et al.

(10) Patent No.: US 12,748,266 B2
(45) Date of Patent: Sep. 29, 2026

(54) PROTECTOR CONFIGURED TO PROTECT COMPONENTS OF A MULTI-FIBER CONNECTOR

(71) Applicant: BELDEN CANADA ULC, Saint-Laurent (CA)

(72) Inventors: Moses Levy, Laval (CA); Ana Carolina Marino Cruz, Pierrefonds (CA)

(73) Assignee: BELDEN CANADA ULC, Saint-Laurent (CA)

( * ) Notice: Subject to any disclaimer, the term of this patent is extended or adjusted under 35 U.S.C. 154(b) by 251 days.

(21) Appl. No.: 18/668,905

(22) Filed: May 20, 2024

(65) Prior Publication Data

US 2024/0385392 A1 Nov. 21, 2024

Related U.S. Application Data

(60) Provisional application No. 63/467,810, filed on May 19, 2023.

(51) Int. Cl.
*G02B 6/38* (2006.01)

(52) U.S. Cl.
CPC ......... *G02B 6/3897* (2013.01); *G02B 6/3885* (2013.01)

(58) Field of Classification Search
CPC ............................ G02B 6/3897; G02B 6/3885
See application file for complete search history.

(56) References Cited

U.S. PATENT DOCUMENTS 7,654,747 B2 2/2010 Theuerkorn et al.
7,869,685 B2 * 1/2011 Hendrickson .......... G02B 6/545 385/139

(Continued)

FOREIGN PATENT DOCUMENTS

CA 2400249 A1 8/2001
CN 102508340 A 6/2012

(Continued)

OTHER PUBLICATIONS

International Search Report and Written Opinion mailed Nov. 5, 2024. (7 pages).

*Primary Examiner* — Sung H Pak
(74) *Attorney, Agent, or Firm* — MH2 Technology Law Group, LLP

(57) ABSTRACT

A protector for protecting components of a partially pre-assembled multi-fiber connector without increasing a cross-sectional profile of the partially pre-assembled connector may include a housing portion having a receiving portion configured to receive a partially pre-assembled multi-fiber connector portion of a multi-fiber push on (MPO) connector. The receiving portion may be configured to extend from an opening portion at a first end portion of the housing portion to a wall portion at a second end portion of the housing portion. The housing portion may be configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

23 Claims, 8 Drawing Sheets

(56) References Cited

U.S. PATENT DOCUMENTS

| | | | | |
|---|---|---|---|---|
| 8,412,017 | B2 | 4/2013 | Kowalczyk et al. | |
| 10,209,457 | B2 | 2/2019 | Watanabe | |
| 10,598,886 | B2 | 3/2020 | Kowalczyk et al. | |
| 11,754,786 | B2 | 9/2023 | Wu | |
| 2003/0063868 | A1* | 4/2003 | Fentress ............... | G02B 6/3869<br>385/60 |
| 2021/0181433 | A1 | 6/2021 | Cloud et al. | |
| 2022/0206228 | A1 | 6/2022 | Leeson et al. | |

FOREIGN PATENT DOCUMENTS

| | | | |
|---|---|---|---|
| CN | 217279026 | U | 8/2022 |
| WO | 2016195902 | A1 | 12/2016 |
| WO | 2019008651 | A1 | 1/2019 |
| WO | 2023141709 | A1 | 8/2023 |

* cited by examiner

PROTECTOR CONFIGURED TO PROTECT COMPONENTS OF A MULTI-FIBER CONNECTOR

CROSS REFERENCE TO RELATED APPLICATION

This application claims the benefit of U.S. Provisional Application No. 63/467,810, filed May 19, 2023, the disclosure of which is hereby incorporated by reference herein in its entirety.

TECHNICAL FIELD

The present disclosure generally relates to fiber optic connectors and, more particularly, to a protector configured to protect components of a multi-fiber connector, for example, during pushing and/or pulling of the connector with an attached fiber cable through a conduit.

BACKGROUND

Service providers are increasingly relying on fiber optics to carry information in data, voice, and other communication networks. In a fiber optic network, each individual fiber is generally connected to both a source and a destination device. Additionally, along the fiber optic run between the source and the destination, various connections or couplings may be made along the fiber optic run to adjust the length of the fiber run. Each connection or coupling requires a connector and/or an adaptor configured to align the fibers as precisely as possible such that the light can be transmitted through the connection or coupling without interruption.

Since the mechanical tolerances involved in terminating optical fiber cable are stringent in most applications, optical fiber is generally not terminated on site. Instead, optical fiber cable is often provided in a range of different lengths and is pre-terminated at both ends with an optical fiber connector ready to be coupled with another optical component. In the case of a multi-fiber cable, one such optical fiber connector is a multi-fiber push on (MPO) connector. Conventional MPO connectors include optical ferrules that are manufactured according to JIS C 5981 and IEC 61754-5 standards and the like. Such optical ferrules are called Mechanically Transferable (MT) ferrules and are typically used for connecting multiple optical fibers. The number of optical fibers may be, but are not limited to, 4, 6, 8, 12, or more than 12 fibers, or any number between any of the listed values.

In many installations, optical fiber cables are routed through a protective conduit that not only protects the cable, but also allows for rapid restoration methods when the conduit, fiber optic cable, or both are cut or damaged and replacement is necessary. Conventional pre-installed MPO connectors are manufactured according to an industry standard footprint, and the fully assembled connectors may be too large to be pushed or pulled through certain conduits, for example, microducts, such as microducts having internal diameters of only about 10 mm, or even 6 mm, that are essentially large enough for the multi-fiber cables to pass through but not large enough for a fully assembled MPO connector to pass through.

Therefore, it has become useful to provide partially assembled connectors for multi-fiber connectors, such as MPO connectors, that are partially pre-assembled with requisite tolerances, and that are sized to be pushed or pulled through a conduit, for example, a microduct. With such partially pre-assembled MPO connectors, final assembly of the MPO connector components may be performed on site once the objective of delivering the fiber through a length of microduct has been achieved.

It may therefore be desirable to provide a protector that is configured to be coupled with a partially pre-assembled multi-fiber connector, for example, a partially pre-assembled MPO connector, without increasing a cross-sectional profile of the partially pre-assembled connector, so as to protect the pre-assembled multi-fiber connector during pushing and/or pulling through a conduit, for example, a microduct, that is sized to receive the partially pre-assembled multi-fiber connector and to prevent passage of a fully assembled multi-fiber connector.

SUMMARY

According to an embodiment of the disclosure, a protector configured to protect components of a partially pre-assembled multi-fiber connector without increasing a cross-sectional profile of the partially pre-assembled connector may include a housing portion having a first end portion, a second end portion opposite to the first end portion, and a receiving portion configured to receive a partially pre-assembled multi-fiber connector portion of a multi-fiber push on (MPO) connector. The receiving portion may be configured to include an opening portion at the first end portion, and wherein a cavity portion may extend from the opening portion to a wall portion at the second end portion. The housing portion may include two opposed first side wall portions and two opposed second side wall portions, and each of the two opposed second side wall portions may be connected to the two opposed first side wall portions so as to provide the receiving portion with a rectangular cross sectional profile. The two opposed first side wall portions may include an engagement portion, and the engagement portion may include an engagement feature configured to receive an engagement structure of a partially pre-assembled multi-fiber connector. The housing portion may be configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

According to some embodiments of the foregoing protector, the engagement feature may comprise one of a hole, an opening, or a notch.

According to some embodiments of the foregoing protectors, the housing portion may include a friction reduction portion structurally configured to reduce friction with a conduit as the protector is pushed or pulled through the conduit.

According to some embodiments of the foregoing protectors, the friction reduction portion may comprise rounded corner portions where the first side wall portions meet the second side wall portions.

According to some embodiments of the foregoing protectors, the friction reduction portion may comprise an extension portion configured to extend outward from an outer surface of the second side wall portions.

According to some embodiments of the foregoing protectors, the extension portion may comprise an elongated projection having a smaller surface area than the second side walls so as to reduce a surface area of the protector that is configured to contact an inner surface of a conduit According to an embodiment of the disclosure, a protector configured to protect components of a partially pre-assembled multi-fiber connector without increasing a cross-sectional profile of the partially pre-assembled connector may include a housing portion having a first end portion, a second end portion opposite to the first end portion, and a receiving portion configured to receive a partially pre-assembled multi-fiber connector portion of a multi-fiber push on (MPO) connector. The receiving portion may be configured to include an opening portion at the first end portion, and a cavity portion may extend from the opening portion to a wall portion at the second end portion. The housing portion may be structurally configured to include an engagement portion that is configured to receive an engagement structure of a partially pre-assembled multi-fiber connector. The housing portion may be configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

According to some embodiments of the foregoing protector, protector, the engagement feature may comprise one of a hole, an opening, or a notch.

According to some embodiments of the foregoing protectors, the housing portion may include a friction reduction portion structurally configured to reduce friction with a conduit as the protector is pushed or pulled through the conduit.

According to some embodiments of the foregoing protectors, the housing portion may include two opposed first side wall portions and two opposed second side wall portions According to some embodiments of the foregoing protectors, each of the two opposed second side wall portions may be connected to the two opposed first side wall portions so as to provide the receiving portion with a rectangular cross sectional profile;

According to some embodiments of the foregoing protectors, the friction reduction portion may comprise rounded corner portions where the first side wall portions meet the second side wall portions.

According to some embodiments of the foregoing protectors, the friction reduction portion may comprise an extension portion configured to extend outward from an outer surface of the second side wall portions.

According to some embodiments of the foregoing protectors, the extension portion may comprise an elongated projection having a smaller surface area than the second side walls so as to reduce a surface area of the protector that is configured to contact an inner surface of a conduit.

According to an exemplary embodiment of the disclosure, a protector for protecting components of a partially pre-assembled multi-fiber connector without increasing a cross-sectional profile of the partially pre-assembled connector may include a housing portion having a receiving portion configured to receive a partially pre-assembled multi-fiber connector portion of a multi-fiber push on (MPO) connector. The receiving portion may be configured to extend from an opening portion at a first end portion of the housing portion to a wall portion at a second end portion of the housing portion. The housing portion may be configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector According to some embodiments of the foregoing protector, the housing may be configured to include an engagement portion that is configured to receive an engagement portion of a partially pre-assembled multi-fiber connector.

According to some embodiments of the foregoing protectors, the engagement portion may comprise one of a hole, an opening, or a notch.

According to some embodiments of the foregoing protectors, the housing portion may include a friction reduction portion structurally configured to reduce friction with a conduit as the protector is pushed or pulled through the conduit.

According to some embodiments of the foregoing protectors, the housing portion may include two opposed first side wall portions and two opposed second side wall portions According to some embodiments of the foregoing protectors, each of the two opposed second side wall portions may be connected to the two opposed first side wall portions so as to provide the receiving portion with a rectangular cross sectional profile;

According to some embodiments of the foregoing protectors, the friction reduction portion may comprise rounded corner portions where the first side wall portions meet the second side wall portions.

According to some embodiments of the foregoing protectors, the friction reduction portion may comprise an extension portion configured to extend outward from an outer surface of the second side wall portions.

According to some embodiments of the foregoing protectors, the extension portion may comprise an elongated projection having a smaller surface area than the second side walls so as to reduce a surface area of the protector that is configured to contact an inner surface of a conduit.

BRIEF DESCRIPTION OF THE DRAWINGS

Further advantages and features of the present disclosure will become apparent from the following detailed description and the accompanying drawings.

DETAILED DESCRIPTION

Figures 1A, 1B, 1C, 1D, 1E:
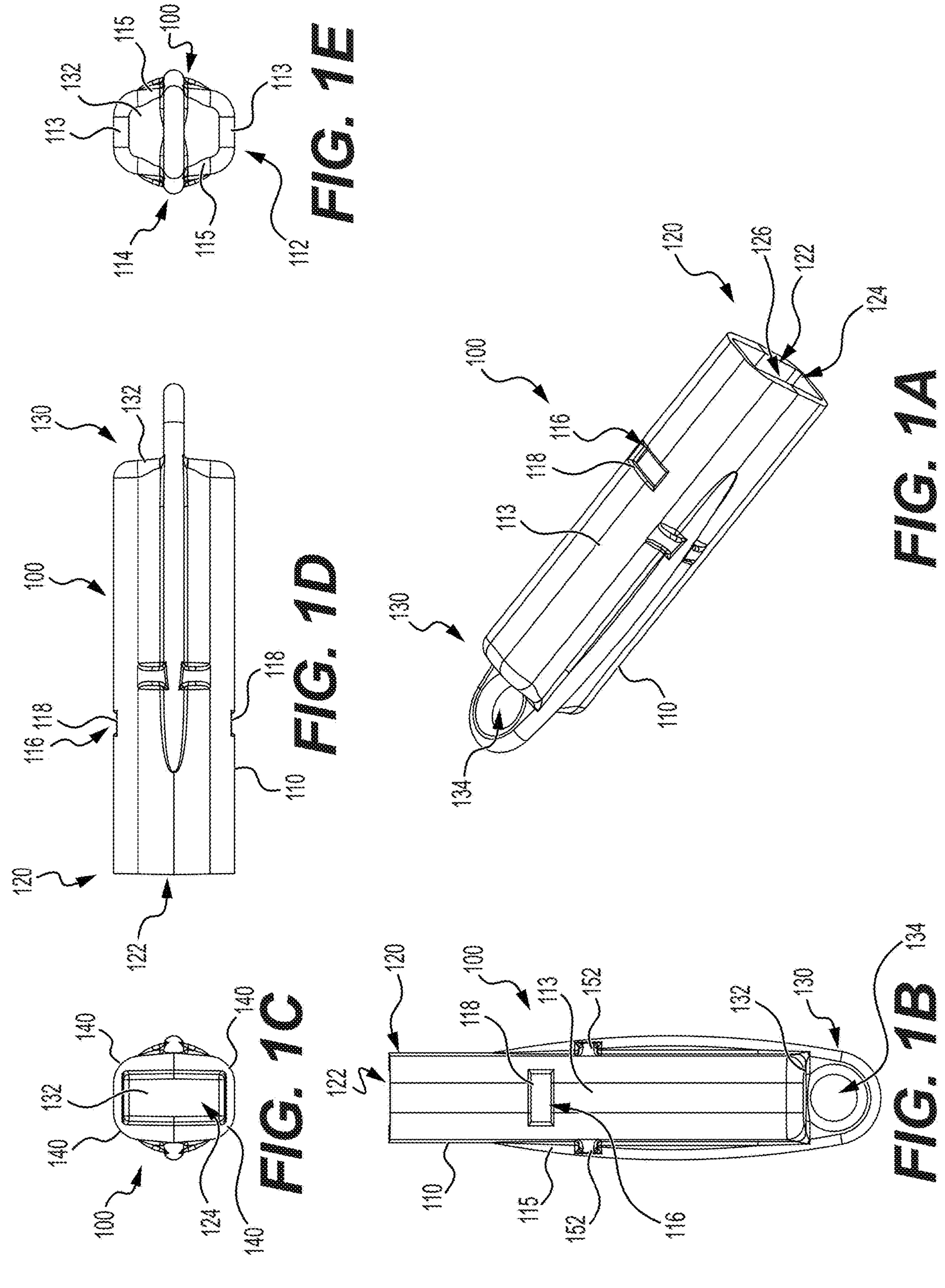
FIGS. 1A-1E illustrate multiple views of an exemplary protector for protecting components of a multi-fiber connector in accordance with various aspects of the disclosure.

Reference will now be made in detail to presently preferred embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure. Furthermore, the terminology used herein is used only for the purpose of describing particular embodiments of the present disclosure and is not intended to be limiting in any way.

As used in the specification and the appended claims, the singular form "a," "an," and "the" include plural referents unless the context clearly indicates otherwise. For example, reference to a component in the singular is intended to also include a plurality of components.

FIGS. 1A-1E illustrate an exemplary protector or protector portion 100 for protecting components of a multi-fiber connector in accordance with various aspects of the disclosure. In the illustrated embodiment, the protector 100 is a single, monolithic structure of unitary construction. The protector 100 comprises an elongated housing or housing portion 110 having a first end or first end portion 120 and a second end or second end portion 130 and a receiving portion 122 configured to receive a multi-fiber connector. The receiving portion 122 may include an opening portion 124 at the first end 120 of the protector 100 and a cavity or cavity portion or bore 126, for example, a blind bore, that extends from the opening 124 to a wall portion 132 at the second end 130 of the protector 100. In the illustrated embodiment, the receiving portion 122 is rectangular and is sized to receive a multi-fiber connector, as described in more detail below.

The housing 110 includes a first side wall portion 112 and a second side wall portion 114. In the illustrated embodiment, the first side wall portion 112 includes two opposed first side walls 113, and the second side wall portion 114 includes two opposed second side walls 115. When viewed from the first end 120 of the housing 110, the second side walls 114 are longer than the first side walls 112 in the cross sectional profile of the housing 110. The first side wall portion 112 includes an engagement portion 116. In the illustrated embodiment, the engagement portion 116 includes engagement features 118, for example, holes, openings, or notches, on each of the two opposed first side walls 113.

As illustrated in FIGS. 10 and 1E, the housing 110 include rounded corner portions 140 where the first side walls 113 meet the second side walls 115. The second side walls 115 may include an extension portion 150 configured to extend outward from an outer surface of the second side walls. The extension portion 150, for example, an elongated projection, may include an elongated projection that reduces a surface area of the second side walls that can contact an inner surface of a conduit or duct. The rounded corner portions 140 and/or the extension portion may reduce friction with the conduit as the protector 100 is pushed or pulled through the conduit. In some embodiments, one or both of the second side walls 115 may include a stop portion 152, for example, a bump or protrusion, configured to facilitate alignment with a removal tool that may be used to remove the protector 100 from a connector, as will be described in more detail below.

The second end 130 may include a receiving portion 134, for example, a through hole, opening, hoop, or the like, configured to receive a pulling member to pull the protector through a conduit or to be coupled with another protector or connector to be pulled through the conduit with the protector 100.

Figure 2:
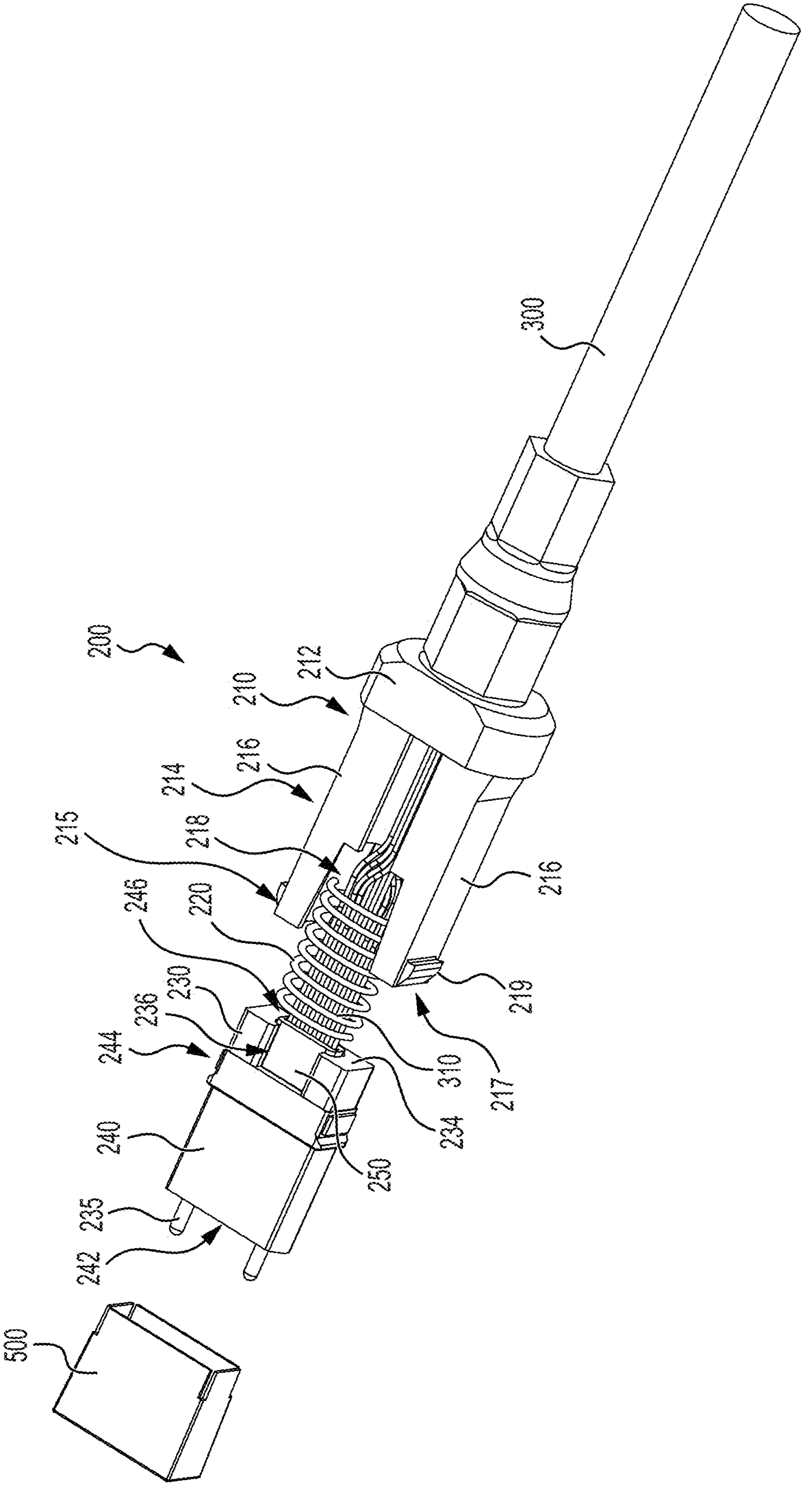
FIG. 2 is a perspective view of an exemplary ferrule protective cap and multi-fiber cable terminated with a multi-fiber connector.
Figure 3:
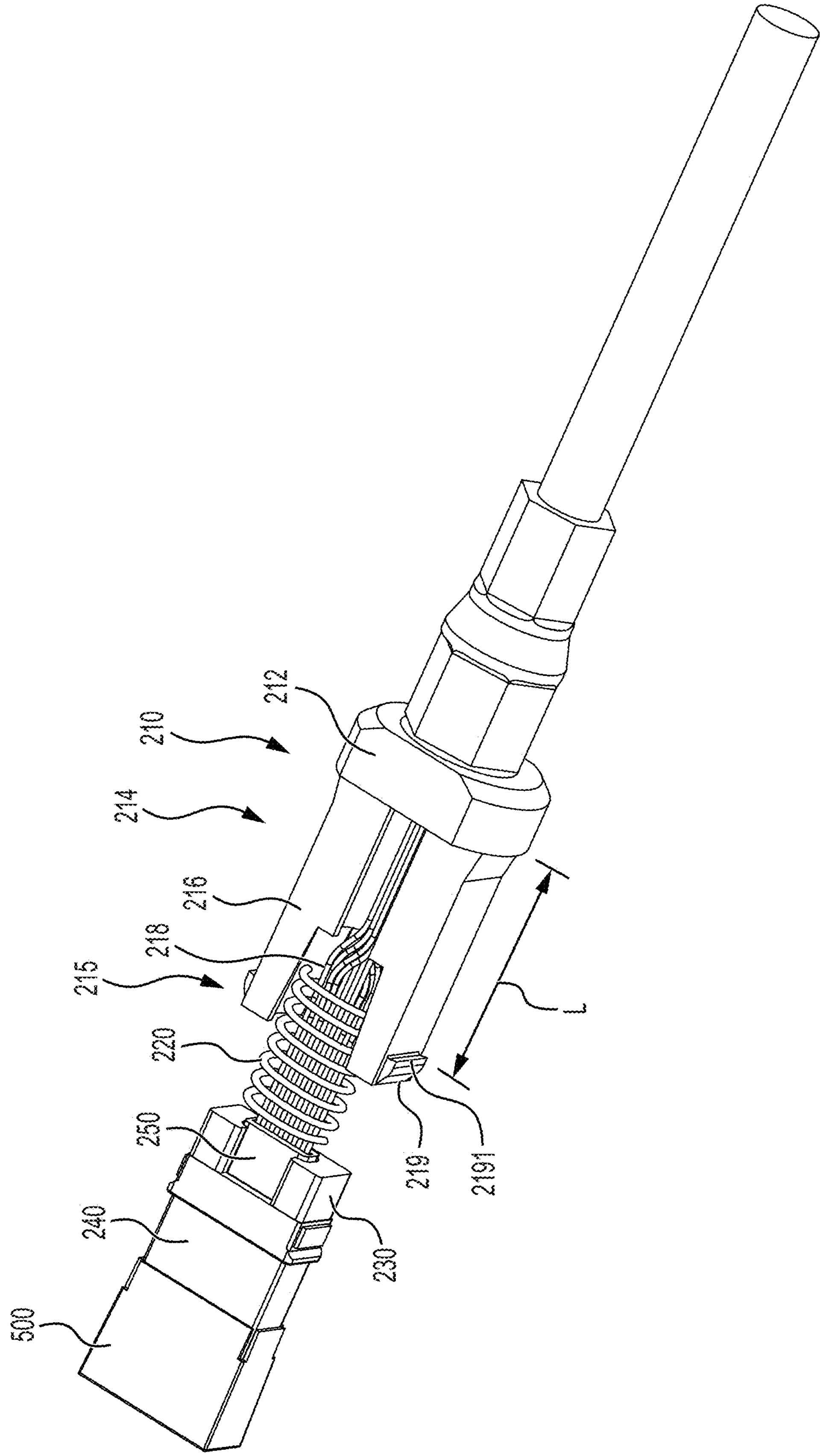
FIG. 3 is a perspective view of the multi-fiber cable terminated with a multi-fiber connector of FIG. 2 with the ferrule protective cap coupled with the connector.
Figure 8:
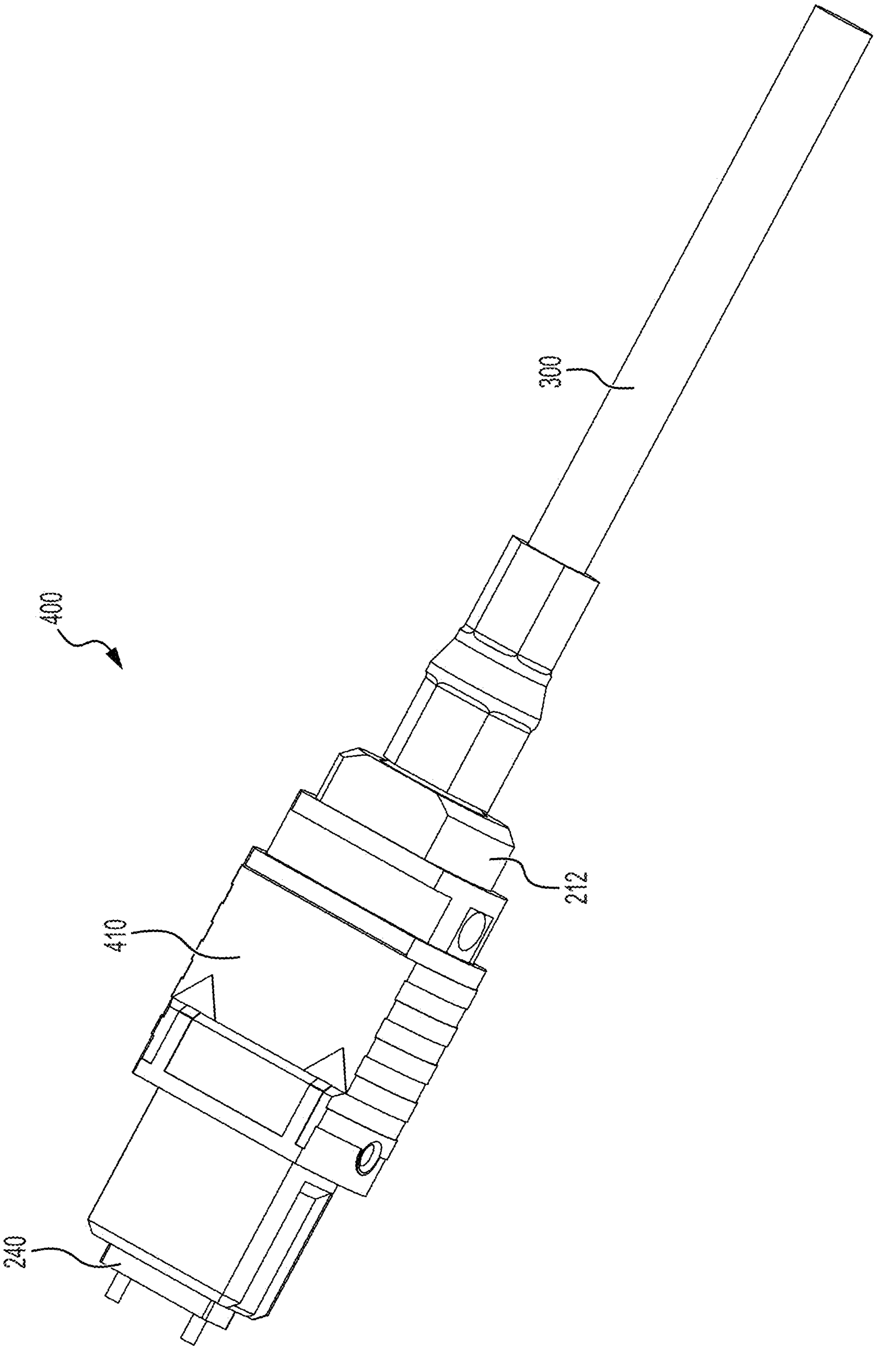
FIG. 8 is a perspective view of an exemplary MPO-type connector that includes the multi-fiber connector of FIG. 4.

FIGS. 2 and 3 illustrate an exemplary multi-fiber connector 200. The multi-fiber connector 200 may comprise a portion of a fully assembled multi-fiber connector, such as a multi-fiber push on (MPO) connector 400, as depicted in FIG. 8. In other words, the multi-fiber connector 200 may comprise a partially assembled portion of the MPO connector 400. The MPO connector 400 includes an outer housing portion 410 coupled with the multi-fiber connector 200 to provide a ready to use connector, as would be understood by persons skilled in the art. The outer housing portion 410 may comprise one or more housing members. A ferrule protective cap 500 may be used to protect a ferrule of the connector 200 during assembly and/or installation of the MPO connector 400.

The multi-fiber connector 200 includes a back post portion 210, a biasing member or biasing portion 220, for example, a compression spring, a pin holder portion 230 that includes alignment pins 235 (i.e., for a male connector), a ferrule 240, and a ferrule boot portion 250. The back post portion 210 is configured to be coupled with a fiber optic cable 300, for example, by a crimp ring or by any other cable retention means, as would be understood by persons skilled in the art.

The back post portion 210 may include a flange portion 212 at a rear end and a forward portion 214 extending from the flange portion 212 to an engagement portion 215 at a front end of the back post portion 210. In the illustrated embodiment, the forward portion 214 includes two opposed biasing members or biasing portions 216, for example, elongated arms, that extend from the flange portion 212 and are configured to define a receiving portion 218, for example, a space, opening, or cavity, therebetween that is configured (e.g., sized and arranged) to receive the biasing member 220 therein. In the illustrated embodiment, the engagement portion 215 comprises engagement structures 219 at a free end portion 217 of each of the two biasing members 216. Each of the engagement structures 219 may comprise, for example, a protrusion or tab, that extends outward away from the opposed biasing members 216. The two opposed biasing members 216 may be flexible in a direction toward and away from one another such that the biasing members 216 are configured to be urged toward one another when a force is applied to surfaces of the biasing members 216 that face away from one another and to be moved away from one another by a biasing force of the biasing members 216 when the force is reduced or removed.

In some embodiments, such as the embodiment shown in FIGS. 2 and 3, the biasing member 220 may comprise a flattened oval compression spring configured such that the biasing member essentially does not extend beyond a thickness of the latch portion 214. In some embodiments, the internal configuration/dimensions of the receiving portion 218 may essentially match the external dimensions of the biasing member 220 to minimize play, or movement, of the biasing member 220 within the receiving portion 218.

The ferrule 240 may have a front mating end face 242 and a rear end 244 having a cavity 246 for receiving fibers 310 of the cable 300. A leading end of the fibers 310 may be disposed at the front mating end face 242 for mating with another optical device. The ferrule 240 may also include guide pin holes that may extend through the ferrule 240 from the front mating end face 242 to the rear end 244. In a male connector, the guide pin holes may be configured (e.g., sized and arranged) to receive guide pins 235 therethrough. In a female connector, the guide pin holes may be configured to received guide pins of a mating optical component, for example, a mating multi-fiber connector.

Adjacent the rear end 244 of the ferrule 240, the connector 200 may include the ferrule boot portion 250, which receives the fiber strands therethrough to provide a guide and protect the fibers. The pin holder portion 230 may be configured to fit around the ferrule boot portion 250 to receive the biasing force from the biasing member 220 and transfer the biasing force to the ferrule 240. The pin holder portion 230 may have a front face for abutting the ferrule 240 and a rear face 234 that provides a surface for engaging the biasing member 220 to thereby transfer a biasing force between the ferrule 240 and back post portion 210. In an embodiment for a female connector, the pin holder portion 230 may be used without alignment pins 235, as would be understood by persons skilled in the art. The pin holder portion 230 may include a passage 236 configured to fit around the ferrule boot portion 250.

Figure 4:
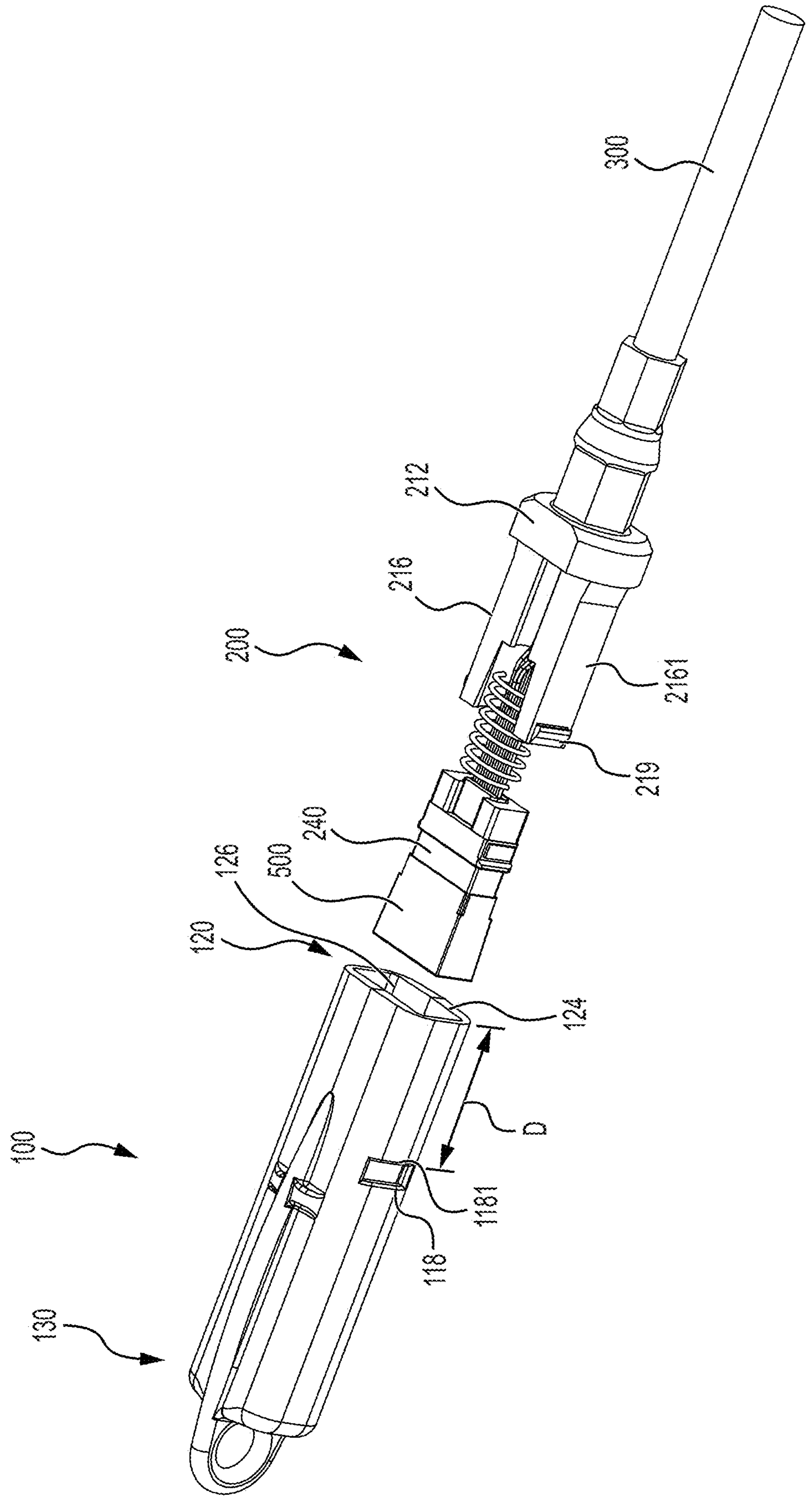
FIG. 4 is a perspective view of the protector of FIG. 1 and the multi-fiber cable terminated with a multi-fiber connector and ferrule protective cap of FIG. 3.
Figure 5:
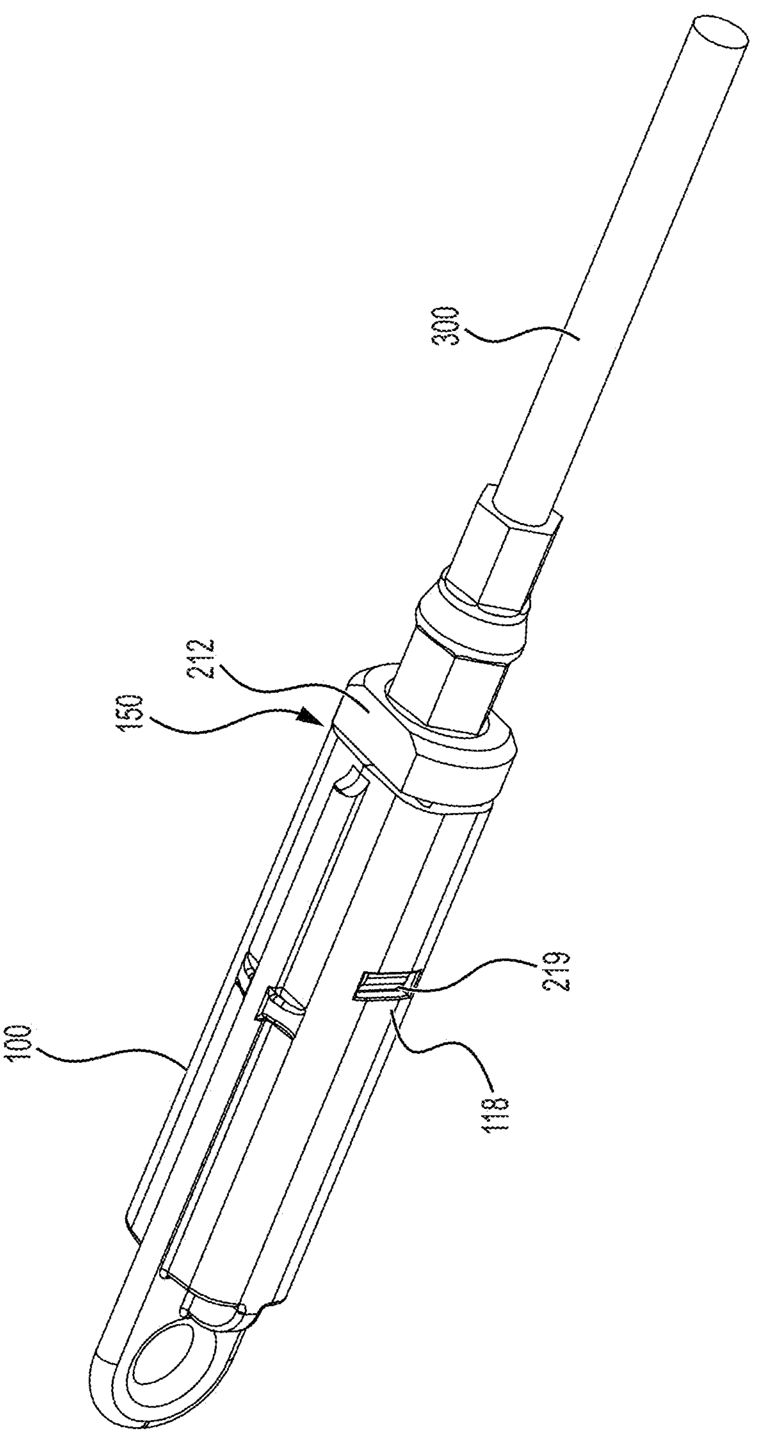
FIG. 5 is a perspective view of the protector of FIG. 1 coupled with the multi-fiber connector of FIG. 4.
Figure 6:
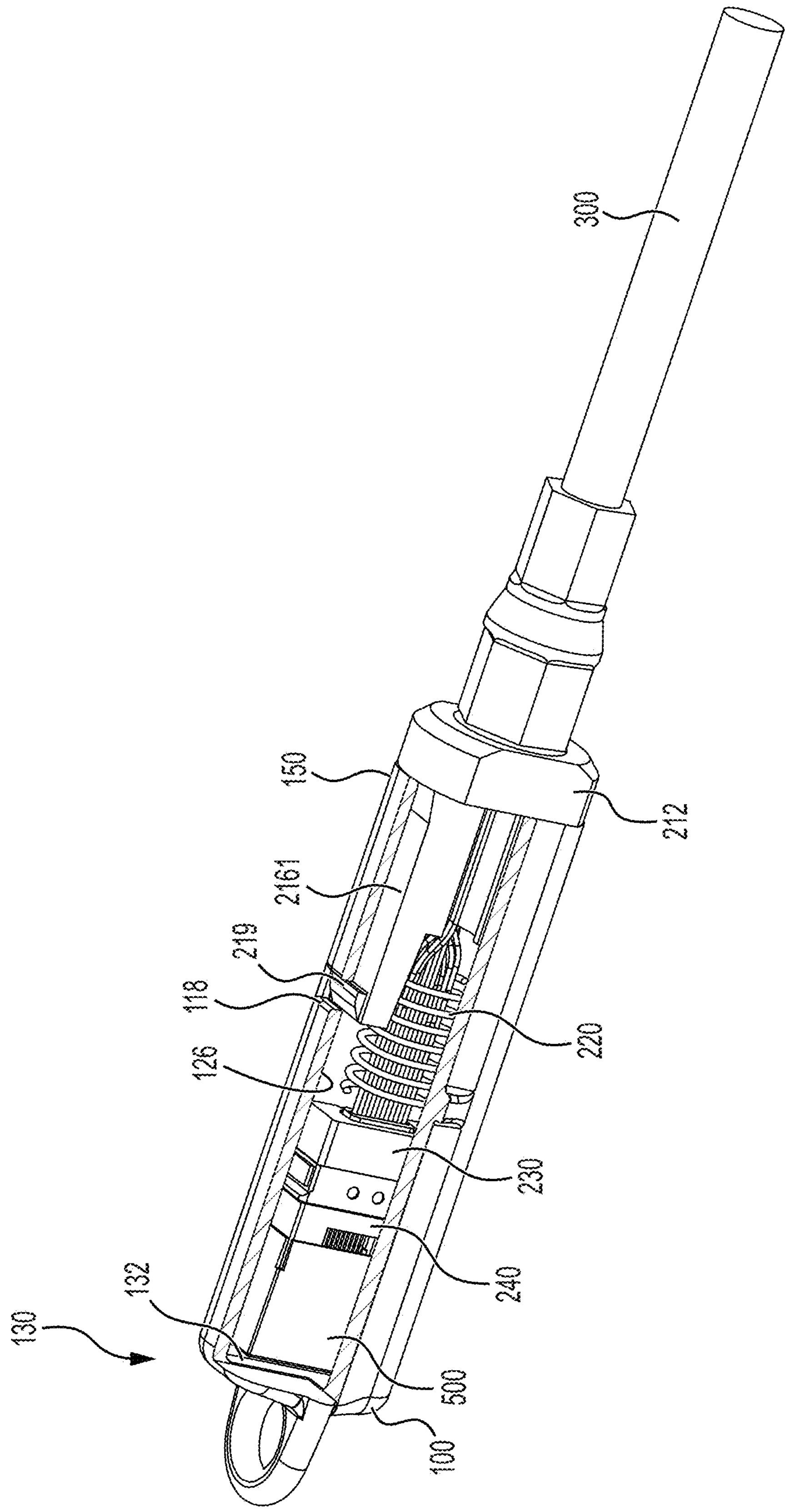
FIG. 6 is a partial cutaway view of the protector of FIG. 1 coupled with the multi-fiber connector of FIG. 4.

Referring now to FIGS. 4-6, the protector 100 is configured to receive the multi-fiber connector 200. As illustrated, the protector 100 is configured to slidingly receive the multi-fiber connector 200 in the receiving portion 122 with or without the ferrule protective cap 500 removed from the ferrule 240.

As shown in FIGS. 5 and 6, the receiving portion 122 of the protector 100 is configured to slidingly receive a portion of the multi-fiber connector 200. For example, the receiving portion 122 is sized to receive the ferrule 240, the ferrule boot portion 250, the biasing member 220, the pin holder portion 230, and the forward portion 214 of the back post portion 210. In some embodiments, the forward portion 214 of the back post portion 210, except for the engagement structures 219, has a cross sectional profile (e.g., height and width) that is similar to, but slightly smaller than, a cross sectional profile of the receiving portion 122. The flange portion 212 of the back post port 210 has a cross sectional profile that is greater than the cross sectional profile of the receiving portion 122 in at least one dimension such that the receiving portion 122 is configured to prevent the flange portion 212 from entering the receiving portion 122.

As best illustrated in FIGS. 4 and 6, the engagement structures 219 of the connector 200 extend outward from outer side surfaces 2161 of the biasing members 216 such that engagement structures 219 extend beyond the cross sectional profile of the forward portion 214 of the back post portion 210 and the cross sectional profile of the receiving portion 122. Thus, when the connector 200 is inserted into the receiving portion 122, the engagement structures 219 contact the inner surface of the first side walls 113 of the protector 100 and the biasing members 216 are urged toward one another to permit further insertion of the forward portion 214 into the receiving portion 122. When the engagement structures 219 of the biasing members 216 reach the engagement portion 116 of the protector 100, the force that urges the biasing members toward one another is reduced or removed, and the biasing members 216 are moved away from one another by the bias of the biasing members 216 such that the engagement features 118 of the protector 100 receive the engagement structures 219 of the biasing members 216.

It should be understood that the engagement portion 215 of the connector 200 is configured to engage the engagement portion 116 of the protector 100 before the flange portion 212 of the connector 200 reaches the first end 120 of the protector 100, as shown by the slight gap 150 between the flange portion 212 and the protector 100. That is, a length L from the flange portion 212 of the connector 200 to a rear end 2191 of each engagement structure 219 is greater that a distance D from the first end 120 of the protector 100 to a rear end 1181 of the engagement feature 118 of the protector 100. In some aspects, the difference between the length L and the distance D may be minimized such that a minimal portion of the forward portion 214 of the connector 200 is disposed outside of the protector 100, while allowing for manufacturing tolerances to avoid the flange portion 212 preventing the engagement structures 219 of the connector 200 from being received by the engagement features 118 of the protector 100. It should be understood that the cavity or bore 126 of the receiving portion 122 has a length from the first end 120 of the protector 100 to the wall portion 132 at the second end 130 of the protector 100 that is sized such that the protector is configured to prevent the alignment pins 235 and the ferrule 240 from reaching wall portion 132.

In use, an end of the cable 300 is prepared and terminated with the multi-fiber connector 200, as is well known in the art. The multi-fiber connector 200 (with or without the ferrule protective cap 500) is inserted into receiving portion 122 of the protector 100. For example, the ferrule 240, the ferrule boot portion 250, the biasing member 220, the pin holder portion 230, and the forward portion 214 of the back post portion 210 are inserted into the receiving portion 122 via the opening 124 at the first end 120 of the housing 110. As the forward portion 214 is inserted into the receiving portion 122, the engagement structures 219 contact the inner surface of the first side walls 113 of the protector 100 and the biasing members 216 are urged toward one another to permit further insertion of the forward portion 214 into the receiving portion 122. When the engagement structures 219 of the biasing members 216 reach the engagement portion 116 of the protector 100, the force that urges the biasing members toward one another is reduced or removed, and the biasing members 216 are moved away from one another by the bias of the biasing members 216 such that the engagement features 118 of the protector 100 receive the engagement structures 219 of the biasing members 216 to couple, for example, securely couple, the protector 100 to the connector 200. The connector 200 with the protector 100 coupled thereto can then be pushed or pulled through a conduit, for example, a microduct having an inner diameter that is smaller than the fully assembled MPO connector illustrated in FIG. 8, for deployment to a desired location where the connector 200 is to be coupled with the MPO housing portion 410 to provide the fully assembled MPO connector 400 such that the MPO connector 400 can be connected with another optical component, as is known to persons skilled in the art.

Figure 7:
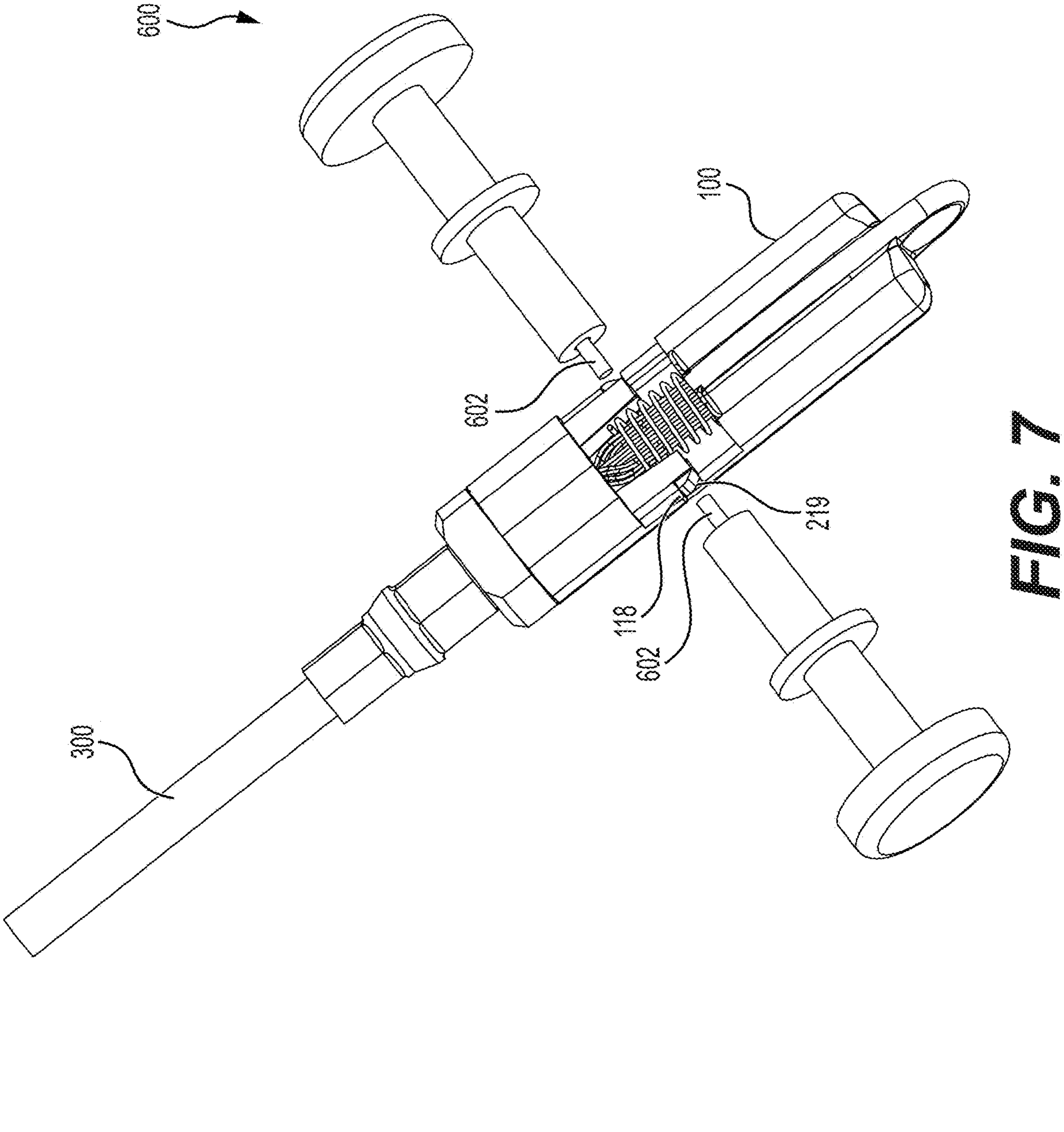
FIG. 7 illustrates an exemplary removal tool and a partial cutaway view of the protector of FIG. 1 coupled with the multi-fiber connector of FIG. 4.

Before being coupled with the MPO housing portion 410, the protector 100 must be removed from the connector 200. Referring to FIG. 7, the protector 100 can be removed from the connector 200 by a removal tool 600. The removal tool 600 includes an engagement portion 602, for example, a pin, peg, rod, or the like, configured to be inserted into the engagement feature 116 of the protector 100 so as to urge the engagement structure 219 of one of the biasing members 216 toward the other biasing member 216. As illustrated, the engagement portion 602 of the removal tool 600 includes two engagement portions 602 that are configured to be aligned with the two engagement features 118 on opposite sides of the protector 100. The two engagement portion 602 are inserted into the engagement features 118 to engage the engagement structures 219 and urge engagement structures 219 of the biasing members 216 toward one another such that the engagement structures 219 are removed from the engagement features 118 in order to permit the protector 100 to be removed from the connector 200. As shown, the two engagement portions 602 are independently movable relative to one another, but it would understood by persons skilled in the art that the two engagement portions 602 can be coupled together mechanically so as to be configured to simultaneously engage and urge the engagement portions 602 simultaneously with a single actuation.

After the multi-fiber connector 200 is removed from the protector 100, the MPO housing portion 410 can be coupled with the connector 200, as is known by persons skilled in the art, to provide a fully assembled, ready to use MPO connector, as shown in FIG. 8. For example, the MPO housing portion 410 includes an engagement feature (not shown) configured to be coupled with the engagement structures 219 of the biasing members 216 to couple the housing portion 410 with the connector 200 to provide the MPO connector 400.

While multiple non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A protector configured to protect components of a partially pre-assembled multi-fiber connector without increasing a cross-sectional profile of the partially pre-assembled connector, comprising:

a housing portion having a first end portion, a second end portion opposite to the first end portion, and a receiving portion configured to receive a partially pre-assembled multi-fiber connector portion of a multi-fiber push on (MPO) connector;

wherein the receiving portion is configured to include an opening portion at the first end portion, and wherein a cavity portion extends from the opening portion to a wall portion at the second end portion;

wherein the housing portion includes two opposed first side wall portions and two opposed second side wall portions, and wherein each of the two opposed second side wall portions is connected to the two opposed first side wall portions so as to provide the receiving portion with a rectangular cross sectional profile;

wherein the two opposed first side wall portions include an engagement portion;

wherein the engagement portion includes an engagement feature configured to receive an engagement structure of a partially pre-assembled multi-fiber connector; and wherein the housing portion is configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

2. The protector of claim 1, wherein the engagement feature comprises one of a hole, an opening, or a notch.

3. The protector of claim 1, wherein the housing portion includes a friction reduction portion structurally configured to reduce friction with a conduit as the protector is pushed or pulled through the conduit.

4. The protector of claim 3, wherein the friction reduction portion comprises rounded corner portions where the first side wall portions meet the second side wall portions.

5. The protector of claim 3, wherein the friction reduction portion comprises an extension portion configured to extend outward from an outer surface of the second side wall portions.

6. The protector of claim 5, wherein the extension portion comprises an elongated projection having a smaller surface area than the second side walls so as to reduce a surface area of the protector that is configured to contact an inner surface of a conduit.

7. A protector configured to protect components of a partially pre-assembled multi-fiber connector without increasing a cross-sectional profile of the partially pre-assembled connector, comprising:

a housing portion having a first end portion, a second end portion opposite to the first end portion, and a receiving portion configured to receive a partially pre-assembled multi-fiber connector portion of a multi-fiber push on (MPO) connector;

wherein the receiving portion is configured to include an opening portion at the first end portion, and wherein a cavity portion extends from the opening portion to a wall portion at the second end portion;

wherein the housing portion is structurally configured to include an engagement portion that is configured to receive an engagement structure of a partially pre-assembled multi-fiber connector; and wherein the housing portion is configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

8. The protector of claim 7, wherein the engagement portion comprises one of a hole, an opening, or a notch.

9. The protector of claim 7, wherein the housing portion includes a friction reduction portion structurally configured to reduce friction with a conduit as the protector is pushed or pulled through the conduit.

10. The protector of claim 9, wherein the housing portion includes two opposed first side wall portions and two opposed second side wall portions.

11. The protector of claim 10, wherein each of the two opposed second side wall portions is connected to the two opposed first side wall portions so as to provide the receiving portion with a rectangular cross sectional profile.

12. The protector of claim 10, wherein the friction reduction portion comprises rounded corner portions where the first side wall portions meet the second side wall portions.

13. The protector of claim 10, wherein the friction reduction portion comprises an extension portion configured to extend outward from an outer surface of the second side wall portions.

14. The protector of claim 13, wherein the extension portion comprises an elongated projection having a smaller surface area than the second side walls so as to reduce a surface area of the protector that is configured to contact an inner surface of a conduit.

15. A protector configured to protect components of a partially pre-assembled multi-fiber connector without increasing a cross-sectional profile of the partially pre-assembled connector, comprising:

a housing portion having a receiving portion configured to receive a partially pre-assembled multi-fiber connector portion of a multi-fiber push on (MPO) connector;

wherein the receiving portion is configured to extend from an opening portion at a first end portion of the housing portion to a wall portion at a second end portion of the housing portion; and wherein the housing portion is configured to be coupled with a biasing portion of a partially pre-assembled multi-fiber connector without increasing a cross-sectional profile of the partially pre-assembled connector so as to permit the housing portion to protect components of the pre-assembled multi-fiber connector during pushing and/or pulling of the pre-assembled multi-fiber connector through a conduit that is sized to receive the partially pre-assembled multi-fiber connector and to prevent passage of a fully assembled MPO connector.

16. The protector of claim 15, wherein the housing is configured to include an engagement portion that is configured to receive an engagement portion of a partially pre-assembled multi-fiber connector.

17. The protector of claim 16, wherein the engagement portion comprises one of a hole, an opening, or a notch.

18. The protector of claim 15, wherein the housing portion includes a friction reduction portion structurally configured to reduce friction with a conduit as the protector is pushed or pulled through the conduit.

19. The protector of claim 18, wherein the housing portion includes two opposed first side wall portions and two opposed second side wall portions.

20. The protector of claim 19, wherein each of the two opposed second side wall portions is connected to the two opposed first side wall portions so as to provide the receiving portion with a rectangular cross sectional profile.

21. The protector of claim 19, wherein the friction reduction portion comprises rounded corner portions where the first side wall portions meet the second side wall portions.

22. The protector of claim 19, wherein the friction reduction portion comprises an extension portion configured to extend outward from an outer surface of the second side wall portions.

23. The protector of claim 22, wherein the extension portion comprises an elongated projection having a smaller surface area than the second side walls so as to reduce a surface area of the protector that is configured to contact an inner surface of a conduit.

* * * * *